(12) United States Patent
Jacquemart et al.

(10) Patent No.: US 12,493,852 B2
(45) Date of Patent: Dec. 9, 2025

(54) SYSTEM AND METHOD FOR MANAGING A PLURALITY OF MOBILE ROBOTS FOR PREPARING ORDERS FOR PRODUCTS STORED IN A WAREHOUSE

(71) Applicant: IFOLLOW, Arcueil (FR)

(72) Inventors: Vincent Jacquemart, Meudon (FR); Nicolas Menigoz, Paris (FR)

(73) Assignee: IFOLLOW, Arcueil (FR)

( * ) Notice: Subject to any disclaimer, the term of this patent is extended or adjusted under 35 U.S.C. 154(b) by 248 days.

(21) Appl. No.: 18/004,760

(22) PCT Filed: Jul. 9, 2021

(86) PCT No.: PCT/EP2021/069209
§ 371 (c)(1),
(2) Date: Jan. 9, 2023

(87) PCT Pub. No.: WO2022/008735
PCT Pub. Date: Jan. 13, 2022

(65) Prior Publication Data
US 2023/0259878 A1    Aug. 17, 2023

(30) Foreign Application Priority Data
Jul. 10, 2020  (FR) ...................................... 2007364

(51) Int. Cl.
*G06Q 10/087* (2023.01)
*G05D 1/00* (2006.01)

(52) U.S. Cl.
CPC ......... *G06Q 10/087* (2013.01); *G05D 1/0297* (2013.01)

(58) Field of Classification Search
CPC ..... G06Q 10/087; G06Q 10/04; G05D 1/0297
See application file for complete search history.

(56) References Cited

U.S. PATENT DOCUMENTS

| | | | |
|---|---|---|---|
| 9,694,977 B2 | 7/2017 | Aprea et al. | |
| 10,572,854 B2 | 2/2020 | Johnson et al. | |
| 2016/0101940 A1* | 4/2016 | Grinnell | G05D 1/0289 |
| | | | 700/218 |
| 2018/0201444 A1 | 7/2018 | Welty et al. | |
| 2019/0095854 A1* | 3/2019 | Pandya | B65G 1/0492 |

FOREIGN PATENT DOCUMENTS

WO        2016014917 A1      1/2016

OTHER PUBLICATIONS

International Search Report dated Sep. 28, 2021 for corresponding International Application No. PCT/EP2021/069209, filed Jul. 9, 2021.

(Continued)

*Primary Examiner* — Rokib Masud
(74) *Attorney, Agent, or Firm* — IPSILON USA, LLP (57) ABSTRACT

A method for managing a plurality of autonomous mobile robots, referred to as picking robots, for order-picking of products stored in a warehouse having a plurality of product storage spaces, a plurality of areas for stock-picking by a plurality of operators, and a plurality of areas for the collection of products picked by the picking robots. Also provided are a management system and an order-picking method.

12 Claims, 7 Drawing Sheets

(56) References Cited

OTHER PUBLICATIONS

Written Opinion of the International Searching Authority dated Sep. 28, 2021 for corresponding International Application No. PCT/EP2021/069209, filed Jul. 9, 2021.

English translation of the Written Opinion of the International Searching Authority dated Sep. 28, 2021 for corresponding International Application No. PCT/EP2021/069209, filed Jul. 9, 2021.

* cited by examiner

SYSTEM AND METHOD FOR MANAGING A PLURALITY OF MOBILE ROBOTS FOR PREPARING ORDERS FOR PRODUCTS STORED IN A WAREHOUSE

CROSS-REFERENCE TO RELATED APPLICATIONS

This Application is a Section 371 National Stage Application of International Application No. PCT/EP2021/069209, filed Jul. 9, 2021, which is incorporated by reference in its entirety and published as WO 2022/008735 A1 on Jan. 13, 2022, not in English.

FIELD OF THE INVENTION

The field of the invention is that of logistics, in particular for preparing orders within a warehouse for storing products to be shipped.

The present invention relates in particular to the assistance in the preparation of orders by means of autonomous robots (called "Autonomous Mobile robots—AMR").

The invention relates more particularly to the management of a fleet of autonomous robots and the use thereof with picking operators in a warehouse for storing products to be shipped.

PRIOR ART

The field of logistics has been constantly evolving for many years. Concerning the order preparation in particular, there have been many technical and technological developments, ranging from management software to product conveyors as well as the smart storage shelves.

We are particularly interested herein in the preparation of orders performed by operators and assisted by autonomous robots. Thus, the operators and robots cooperate in the same workspace in order to optimally prepare the different orders which are received by the warehouse order management system.

Several picking techniques are thus known, cooperating picking operators and robots.

According to a first approach, which is relatively simple, an operator is in charge of picking the different products of an order at the different locations of the warehouse and placing them on the autonomous robot which accompanies him. A major drawback of this first approach is that the travel times of the robot and the operator are relatively significant, which leads to a very low performance of the operator and the robot respectively. Indeed, the performance can be determined according to the hourly picking rate, that is to say the number of pickings per hour.

According to a second approach, described in U.S. patent application Ser. No. 10/572,854, the warehouse is divided into several regions and a picking operator is assigned to each of these regions. Thus, for each order, the autonomous robot travels through the different regions of the warehouse to collect the products picked by the operators. Although this approach allows increasing the performance of the picking operators by reducing their distance to travel between two pickings, the paths of the picking robots are relatively significant and do not allow obtaining a satisfactory solution.

None of the known solutions of the prior art therefore allows responding, in a fully satisfactory manner, to the increasingly high speeds which are required to date, while taking into account the constraints according to the warehouses.

There is therefore a need to provide a new approach which can adapt in real time to these different constraints while optimising the overall performance of the system, that is to say the performance of the operators and the robots.

SUMMARY OF THE INVENTION

The present technique meets this need by proposing a method for managing a plurality of autonomous mobile robots, called collection robots, for preparing orders for products stored in a warehouse comprising a plurality of spaces for storing products, a plurality of zones for picking the products by a plurality of operators and a plurality of zones for collecting the products picked by the collection robots. The method comprising the following steps implemented in real time:

generating and transmitting data for managing the warehouse, by a product picking manager;

receiving, by an order manager, data for managing the warehouse comprising at least one plurality of order data;

processing, by the order manager, data for managing the warehouse, delivering order scheduling data;

determining, by the order manager, at least one picking zone allocated to a picking operator for processing at least one portion of at least one order and determining at least one collection zone allocated to one of the collection robots for processing at least one portion of at least one order and;

receiving, by a fleet manager, order scheduling data from the order manager;

generating and transmitting, by the fleet manager, a plurality of movement commands to the collection robots, taking into account at least the determined collection and picking zones and the order scheduling data.

Thus, the present technique proposes a new and inventive solution for the preparation of orders implemented by picking operators and autonomous mobile robots in a warehouse. To do this, the picking zones allocated to the operators and the collection zones allocated to the mobile robots are determined in real time, taking into account, among others, data and constraints related to both the warehouse and the orders to be prepared, the picking operators and the robots.

The proposed solution is therefore based on the determination of an optimal scheduling proposal for orders to be prepared and the actual implementation of this scheduling, taking into account real-time data likely to modify the determined optimal scheduling. In this manner, the preparation of orders is optimised in real time for all its aspects (optimisation of picking, collection, use of robots . . . ).

According to a particular aspect, the step of generating and transmitting data for managing the warehouse comprises a sub-step of receiving and processing data relating to the physical configuration of the warehouse and a sub-step of generating at least one navigation graph of the collection robots within the warehouse.

These sub-steps allow in particular taking into consideration all physical specificities of the warehouse, such as for example directions of circulation, prohibited or highly regulated zones, so as to optimise the navigation of the collection robots. Moreover, the method takes into account these characteristics of the warehouse in real time and can therefore reassess the navigation of the robots as soon as a change occurs, such as for example an accidental congestion (collision between two robots, falling of products . . . ) of an aisle or a zone of the warehouse.

According to a particular feature, the step of generating and transmitting data for managing the warehouse further comprises a sub-step of receiving and processing data relating to the picking operators, to an inventory of the products stored in the warehouse and to a list of orders to be prepared.

Thus, not only the characteristics specific to the physical configuration of the warehouse are taken into account, but also characteristics related to the stored products, the lists of orders to be prepared and the operators themselves. In this manner, any change impacting in real time these different aspects of the order preparation in a warehouse can be taken into account, such as for example a movement of stored products from one zone to another, an unforeseen absence of a picking operator.

According to a particular aspect, the step of processing the data for managing the warehouse and of delivering the order scheduling data comprises a sub-step of generating an optimal routing of the movements of the picking operators and the collection robots within the warehouse. In this manner, the method optimises, in real time, the movements of the operators and the robots, so as to schedule the preparation of orders according to an optimal scheme, serving as a basis for the rest of the method.

According to a particular feature, the step of processing the data for managing the warehouse and of delivering the order scheduling data comprises a sub-step of storing the data relating to the picking operators, this data comprising at least one indicator from the number of picking operators present in the warehouse, their performance, their experience and their statistics.

According to a particular aspect, the step of processing the data for managing the warehouse and of delivering the order scheduling data comprises a sub-step of generating a picking strategy comprising a plurality of picking tasks for the picking operators and collecting tasks for the mobile robots.

According to a particular feature, the step of generating and transmitting a plurality of movement commands to the collection robots comprises a sub-step of determining at least one optimal navigation route of the collection robots and a sub-step of planning and assigning the navigation routes to the collection robots.

The present technique also relates to a system for managing a plurality of autonomous mobile robots, called collection robots, for preparing orders for products stored in a warehouse comprising a plurality of spaces for storing the products and a plurality of zones for picking the products by a plurality of operators and a plurality of zones for collecting the products picked by the robots.

The management system comprises:
a picking manager capable of receiving data from a system for managing the warehouse and of generating and transmitting data for managing the warehouse;
an order manager capable of receiving at least the data for managing the warehouse from the picking manager and of delivering order scheduling data;
a fleet manager capable of receiving order scheduling data from the order manager and of communicating movement commands to the plurality of collection robots.

Such a management system is capable of implementing the previously described steps of the method, according to the different embodiments. For example, the management system corresponds to one or more physical servers on site (in the warehouse or a dedicated space near the warehouse), which are remote (at a server host for example) or dematerialised (on the "cloud").

The present technique also relates to a method for preparing orders for products stored in a warehouse comprising a plurality of spaces for storing products, a plurality of zones for picking the products by a plurality of picking operators and a plurality of zones for collecting the products picked by a plurality of autonomous mobile robots, called collection robots, the method comprising the following steps of:
picking, by each picking operator, at least one product of at least one order from a picking zone which is allocated to him;
collecting, by at least one collection robot, products picked by an operator, corresponding to at least one portion of at least one order in a collection zone comprising at least one picking zone;
moving the collection robots to an order reconstitution and/or shipping zone;
reconstituting the orders from the products collected by the collection robots; and
shipping the said reconstituted orders.

Thus, the method for managing the fleet of mobile autonomous robots as previously described allows the implementation of an optimised order preparation method, in real time.

According to a particular aspect, the collection step is implemented by at least two collection robots for at least one of said picking operators.

Thus, the present technique allows considering a very high increase in the order picking performance by providing that an operator picks articles/products while being "accompanied" by two or more robots. Indeed, a picking operator who can supply two or more picking robots is extremely efficient, insofar as he can pick several products, at the same location, for different orders collected by the two robots, instead of performing these pickings in two stages, when he is accompanied by a single robot.

In addition, the order preparation method comprises a two-way communication step between the at least two robots, in order to coordinate their respective movements and to know the progress of the order preparation respectively on the other robot. Indeed, the performance related to the presence of two robots for a picking operator should not be limited by problems of movement of the robots, which must always be in the vicinity of the operator, without colliding.

Finally, in order to overcome any inaccuracies in the information communicated between the robots, in particular concerning their localisations or their respective speeds, the method comprises a pattern recognition step implemented by at least one of the at least two robots. In this manner, the respective positioning of the two robots is more accurate and helps avoiding the collisions.

LIST OF THE FIGURES

The proposed technique, as well as the different advantages it has, will be more easily understood, in the light of the following description of several illustrative and non-limiting embodiments thereof, and the appended drawings, from which.

DETAILED DESCRIPTION OF THE INVENTION

A—General Principle of the Proposed Technique

The general principle of the proposed technique consists in optimising the movements of the picking operators and the autonomous mobile collection robots within a warehouse for storing products to be shipped in order to maximise their use/performance. By improving the performance of the operators and the robots, a greater number of orders can be performed per unit of time (per hour for example).

This optimisation takes into account all the constraints internal to the warehouse in which the technique is implemented. These internal constraints are mostly imposed and inflexible, but often evolving, such as for example priorities between the received orders and the departure times of the delivery trucks or even the conflicts of trajectories between the robots, the directions of circulation in the warehouse, etc.

From these constraints and depending on the orders to be processed, the proposed technique generates an optimal specific scheduling of the orders. If necessary, the technique proposes to split at least certain orders into a plurality of sub-orders.

Then, depending on this specific scheduling, the proposed technique determines, in real time, picking zones for the operators and collection zones for the robots. More particularly, the technique proposes to allocate a picking zone to each operator in order to limit his movements between two product pickings and to promote a good knowledge of his work environment. Similarly, the proposed technique allocates a collection zone to each robot in order to limit its movements so as to complete the tasks, which are assigned thereto, more quickly and to optimise its energy.

According to the proposed technique, depending on the orders to be processed, the picking and collection zones can be modified (extended or reduced) in real time. A picking zone is allocated to only one picking operator and two picking zones cannot overlap. Thus, the movements of the picking operators are facilitated and the inconveniences caused by the presence of several picking operators in a restricted space are avoided.

The collection zones assigned to the autonomous robots can, in turn, group several picking zones depending on the products to be collected.

The proposed technique further includes, depending on the determination of the picking zones, the collection zones, and the scheduling of the orders, generating and transmitting movement commands (or tasks) to each of the robots so that the latter each collect products of at least one portion of at least one order.

At the end of the collection of the products by the different robots, the orders are then reconstituted in order to be shipped in due time.

Thus, unlike the known techniques, the proposed solution allows optimising the logistics flows within the warehouse by reducing the movements of the picking operators while optimising the pace of order preparation.

The proposed technique allows simultaneously optimising the number of operators in the warehouse, the distance between two pickings, the daily weight per operator, the overall journey time of a fleet of robots and even the electrical energy spent by the fleet of robots.

Figure 1:
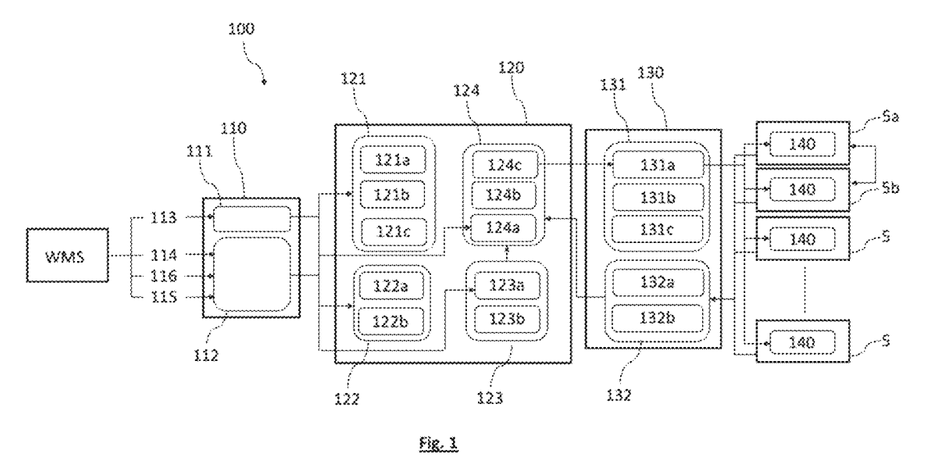
FIG. 1 illustrates a diagram representing the system for managing a plurality of mobile robots for preparing orders for products stored in a warehouse according to the proposed technique.

B—Description of the System for Managing a Plurality of Autonomous Mobile Robots for Preparing Orders for Products Stored in a Warehouse As illustrated in FIG. 1, the system 100 for managing a plurality of autonomous mobile robots for the preparation of orders for products stored in a warehouse comprises different modules, namely a picking manager 110, an order manager 120 and a fleet manager 130. Furthermore, each robot in the fleet of robots comprises a task manager 140 which is integral to the management system 100.

A warehouse management system (WMS), internal and specific to the warehouse in which the proposed technical solution is implemented, provides a certain amount of data to the system 100 for managing a plurality of autonomous mobile robots for the preparation of orders. This warehouse management system (WMS) is known and widely used. It will therefore not be further described in this document.

1) Picking Manager 110:

First of all, the management system 100 includes a picking manager 110, which is a module capable of taking into account all the constraints inherent in the warehouse in which the proposed technical solution is implemented, so as to determine the contours of the overall picking zone which specifically addresses each warehouse.

More particularly, this module 110 allows extracting and processing all the data relating to the flows associated with the warehouse (internal flows of the product picking operators and flows with the outside, such as for example arrivals and departures of order transport trucks), so as to generate warehouse management data. The data received at the input of the picking manager 110 is provided by the warehouse management system (WMS) which is a system generally already present in each order preparation warehouse.

More specifically, the data received by the picking manager 110 relates in particular to the physical configuration of the warehouse 113 which represent the invariable constraints of the latter and which cannot be modified by the management system 100 of the proposed technical solution. For example, this data indicates the dimensions of the warehouse, the zones and directions of circulation within the warehouse, the zones for placing the picked products, the departure times of the delivery trucks, etc.

From the warehouse configuration data 113, a navigation graph generator 111, which is a sub-module of the picking manager 110, is in particular capable of:

loading the global plan of the warehouse;

from this global plan, editing and sorting maps/plans to supply the other modules of the management system;

determining stopping points and waypoints for the mobile robots in the warehouse;

generating one or more navigation graphs connecting all relevant waypoints; and     determining prohibited zones and/or preferred paths for the circulation of mobile robots.

Furthermore, the picking manager 110 has a second sub-module, this sub-module is a warehouse data analyser 112 which is capable of analysing at least one portion of the data coming from the warehouse management system (WMS) and processing/converting them into software data usable by the other modules of the management system 100. More particularly the analyser 112 is configured to receive and process the data 114 relating to the operators, the inventory of the products 115 and the orders list 116.

The data 114 relating to the operators concern, for example, the number of operators present in the warehouse according to the time of the day, their working hours (planning), the maximum weight that can be picked per hour and/or per day of work for each operator, their experience (efficiency and picking statistics), etc.

The data 114 relating to the operators is processed by the analyser 112 in order to be subsequently used by the order manager 120 to determine the number of picking zones in the warehouse and manage the workload of each picking operator, as described in more detail later in this description.

The data relating to the inventory of the products 115 present in the warehouse concern the positioning of the products in the warehouse, the stock of the products, the type of packaging of the products, etc.

This data relating to the inventory of the products 115 is processed by the analyser 112 in order to understand the distribution of the products in the warehouse with the aim of then being used by the order manager 120 to optimise the generation of the picking zones and the flows in the warehouse, as described in more detail later in this description.

The picking manager 110 also takes into account the orders which are to be prepared, this order data being in the form of a list of orders 116 which, at this stage, are not arranged in an optimal manner to allow their preparation. In other words, this command list 116 is raw.

This list of commands 116 is processed by the analyser 112 in order to generate command data which will then be used by the order manager 120 in order to create collection tasks for the mobile robots, as described in more detail later in this description.

2) Order Manager 120:

The order manager 120 is a module of the management system 100 which, taking into account the data transmitted thereto by the picking manager 110, is capable of processing the list of orders 116 depending on the current state (in time real) of the warehouse and the picking operators so as to determine an optimal picking and collection strategy and thus generate robotic tasks to collect the products picked by the picking operators.

More specifically, the order manager 120 manages the orders in real time to establish an optimal strategy for picking and collecting the products in the warehouse in order to carry out the preparation of the orders. From all the data transmitted thereto, the order manager 120 is therefore capable of delivering command scheduling data being in the form of a navigation graph (also called navigation route, or code navigation of the robots) of the robots in the warehouse depending, in particular, on the list of orders and the real-time constraints within the warehouse, such as for example the congestion of an aisle or a picking operator in behind on their tasks.

The order manager 120 comprises four sub-modules, namely: a warehouse modelling sub-module 121, a picking operator modelling sub-module 122, an zone generator 123 and a task generator 124.

Warehouse Modelling Sub-module 121

The warehouse modelling sub-module 121 is capable of receiving and processing data from the navigation graph generator 111 and the warehouse data analyser 112. This sub-module 121 is therefore capable of storing all the data relating to the warehouse such as the state of the warehouse 121a in real time and the navigation routes 121b of the warehouse, the data on the inventory 121c and zones in order to associate routes within the warehouse in real time depending on the current state of the warehouse. In other words, this sub-module aims at determining/updating the optimal routing within the warehouse, depending on the congestion of the aisles for example.

Picking Operator Modelling Sub-module 122

The picking operator modelling sub-module 122 is capable of receiving and processing data from the warehouse data analyser 112. This sub-module 122 is therefore capable of storing all the data relating to the picking operators. More specifically, this sub-module aims at storing data regarding the number of picking operators in the warehouse, their performance, their experience and their statistics 122a.

This module also stores data concerning the picking typology of each picking operator. In other words, this module is capable, depending on the experience of each operator (based in particular on the fact that an experienced picking operator has a better knowledge and memory of the warehouse than a novice picking operator), of differentiating the picking typology for each operator. The term "picking typology" means the fact that a picking operator picks products according to the weight of the products (to reach a maximum weight to be picked each day) and/or on its unit of value, that is to say its packaging (a sample may correspond, for example, to an apple, or to a bag of apples, or to a box comprising several bags of apples or even to a pallet comprising a plurality of boxes).

The picking operator modelling sub-module 122 also allows tracking in real time the state 122b of the picking operators, that is to say their availability and their task being executed.

Zone Generator 123

The purpose of the zone generator 123 is to establish the picking strategy by zones by determining the regions for grouping products distributed in an optimal manner in the warehouse, and this in real time. In other words, the zone generator 123 establishes in real time, and for a given period, the picking zones depending on the configuration of the warehouse, the state of the warehouse, the navigation graphs and the orders to be prepared.

More particularly, the function of the zone generator 123 is to determine in real time the number of picking zones 123a to be implemented in the warehouse in order to optimise the workload of each picking operator. To do this, the zones are determined in view of the occupancy, in real time, of the aisles, which notably takes into account the number of pickings to be performed in a given period of time, at the overlap of orders, in the presence of a novice picking operator or not. Depending on this data, the picking zone generator will reduce or extend the dimensions of the zones in real time to optimise the performance of each picking operator. For example, the more the number of pickings in an aisle increases, the more the picking zone is reduced. Similarly, and for an identical number of pickings, the picking zone of an experienced operator will be larger than the picking zone of a novice operator. In this manner, the workload is optimally distributed between all the picking operators.

The zone generator 123 is also capable of determining the collection points, or grouping points 123b, of the products picked by the picking operators. These collection points define stopping points for the collection robots and are determined so as to optimise the flows within the warehouse. These collection points are dynamic/evolving and are determined in real time depending on the data transmitted by the picking manager 110 and the data feedback from the fleet manager 130, as described in more detail later in this description.

Task Generator 124

The function of the task generator 124, based on the data received from the picking manager 110 and the zone generator 123, is to divide/split/cut the list of orders to be prepared into a plurality of tasks 124a which each comprise sub-tasks, the sub-tasks each corresponding to a journey/movement of a product collection robot in the warehouse.

Thus, the task generator 124 generates, for a given period of time, tasks 124b each comprising sub-tasks (depending on each zone) which may contain products from different orders. In this manner, the picking and the collection of the products can be distributed over several picking operators and over several collection robots in order to optimise the overall effort to execute all the orders.

More specifically, the task generator 124 generates, for a given period of time, picking tasks for the picking operators. These picking tasks are generated in particular by taking into account the number of picking zones and the number of picking operators. Thus, each picking operator can pick a maximum of products while minimising his movements since he only picks products in the picking zone allocated to him. The performance of each picking operator is therefore optimised.

Furthermore, the task generator 124 also generates, for a given period of time, the collection tasks for the robots based on the different collection/grouping points of products associated with each zone and on the availability and capacity of the robots of the fleet of robots.

The availability and the capacity of a robot are determined depending on the robot's operating temperature, the state of charge of the battery thereof, and the maximum weight it can carry.

The task generator 124 therefore generates an optimal picking strategy 124c comprising a plurality of tasks transmitted to the fleet manager 130 which will allocate these different tasks to each robot in order to minimise the movements of the latter, while maximising the number of collected products. The use of the fleet of robots is thus optimised.

It should be noted that the task generator 124 does not modify the picking zones allocated to the picking operators. These picking zones are determined by the zone generator 123.

However, it is the task generator 124 which defines the collection zone of each collection robot by determining the collection points through which the robot must circulate in order to collect all contained products of its task/sub-task. These collection zones for the robots are determined such that a robot can collect the maximum of items while circulating in the fewest picking zones of the picking operators.

The task generator 124 proposes a picking strategy, at a precise moment and for a given period of time, which is optimal both for the picking operators and for the picking robots. However, the task generator 124 does not take into account certain real-time constraints. In particular, the task generator 124 does not take into account a possible blocking of a robot, avoidances between robots during their movements in the warehouse, nor the delay of a picking operator, for example.

These constraints relating to the real-time situation within the warehouse are taken into account by the fleet manager 130.

3) Fleet Manager 130:

The fleet manager 130 deals with the management of the fleet of the collection robots in response to the tasks and sub-tasks generated by the task manager 124. To do this, the fleet manager 130 comprises a task manager sub-module of the fleet 131 and a fleet modelling sub-module 132 which are each in communication with the robots.

The fleet task manager sub-module 131 is capable of receiving the optimal picking strategy determined by the task generator 124 comprising the tasks and sub-tasks generated by the latter in order to distribute them 131a to the different robots of the fleet of collection robots.

From the tasks/subtasks, the task manager sub-module 131 determines the best navigation routes 131b and plans/assigns 131c these routes, in real time, to each robot of the fleet of robots so as to execute all the orders. The determination and planning of the routes take into account the occupation of the warehouse and are optimised so as to avoid the navigation conflicts between the robots and avoid the overlapping of the tasks to be performed.

The function of the fleet modelling sub-module 132 is to monitor the progress state of the tasks 132a as well as the navigation/circulation state 132b of the fleet of collection robots within the warehouse. In other words, this sub-module continuously supervises the state of all the robots deployed in the warehouse.

Depending on the data relating to the state of the robots, that is to say depending on the traffic and the movements of the robots and more generally the state of the fleet of robots, the fleet manager 130 is then capable of modifying/adapting the scheduling of the tasks/sub-tasks generated by the order manager 120 by redistributing/delegating these tasks/sub-tasks. In other words, the fleet manager 130 is capable of modifying the optimal strategy provided by the order manager 120 in order to adapt it to the real-time state of the warehouse. For example, the fleet manager 130 can decide to reroute a task to a robot or to sequence the tasks differently relative to the optimal strategy provided by the order manager 120.

It should be noted that the fleet manager 130 must respect as much as possible the picking strategy provided by the order manager 120. Nevertheless, certain constraints related to the occupation of the warehouse are taken into account by the fleet manager 130. These real-time constraints are also transmitted to the order manager 120 so that the latter can consequently modify the picking strategy for the next time period. Thus, the picking strategy generated by the order manager 120 is regularly updated depending on the state of the warehouse observed by the robot fleet manager 130.

4) Task Manager 140:

As previously indicated, each robot has a task manager 140 which receives the tasks/sub-tasks distributed/allocated by the fleet task manager 131.

More specifically, the task manager 140 receives the tasks/sub-tasks and processes them so as to obtain a navigation list, or commands, specifying the locations to be traversed and the stops to be made. For example, the commands tell the robot to go to the aisle 1 and stop at the grouping point A, then go to the aisle 3 and stop at the grouping point E, etc. until going into to an order reconstitution zone.

The scrolling of the tasks (transition from one task to the next task) is, for example, actuated by the terminal of the picking operator which communicates with the task manager 140 of the robot to indicate that a product has indeed been picked and collected by the collection robot.

When all the tasks of a robot are performed, the fleet manager 130 transmits new tasks/subtasks to the task manager 140 of the robot. In other words, the task managers 140 of the robots respond/react to the fleet manager 130 in real time in order to ensure/guarantee an accurate control of the robots.

Moreover, the task manager 140 is connected to the navigation tools and to other components of the robot, such as the sensors allowing visualising the obstacles, in order to navigate the robot in the warehouse and perform the picking. The task manager 140 is therefore capable of identifying the constraints (the obstacles or congested aisles, for example) encountered by the robot during its navigation in the warehouse in order to inform the fleet manager 130 which can then adapt, in real time, the distribution of the tasks to other robots in the fleet.

Finally, the task manager 140 allows two robots of the fleet to communicate with each other, in particular in the case where two robots are dedicated to the same picking operator.

Indeed, one of the difficulties in this use case lies in the coordination of the movements of the two robots, in order to avoid any collision, while being in the vicinity of the picking operator at any time. In addition, it is important that each robot knows what is the progress of the order preparations of the other robot, to position itself well vis-à-vis the picking operator, the picking space and the collection support, but also to anticipate different movements. Three scenarios are possible at each picking space:

- The "front" robot must receive products, but not the "rear" robot. The "front" robot will therefore stop at the height of the collection space in order to minimise the distance with the picking space, the "rear" robot remaining behind the "front" robot. Once the collection has been completed at this picking point, the two robots can synchronously start and guide the operator to the next picking space.
- The "rear" robot must receive products, but not the "front" robot. The "rear" robot will therefore stop at the height of the collection space in order to minimise the distance with the picking space, the "front" robot remaining in front of the "rear" robot. Once the collection has been completed at this picking point, the two robots can synchronously start and guide the operator to the next picking space.
- The "front" robot and the "rear" robot must receive products. The "front" robot will therefore stop at the height of the collection space in order to minimise the distance with the picking space, the "rear" robot remaining behind the "front" robot. Once the collection concerning the "front" robot at this picking point has been finished, the "front" robot moves forward a few metres, as well as the "rear" robot, so that the "rear" robot stops at the height of the collection space. Once the collection has been completed at this picking point, the two robots can synchronously start and guide the operator to the next picking space.

In order to address these issues and maintain an optimal level of system performance, two robots (or more) can therefore exchange information in real time allowing them to better define their respective trajectories, such as:

- their respective positions (position, orientation, covariance) expressed in the absolute reference mark, that is to say depending on the localisation system specific to each robot; however, this information is subject to uncertainties;
- their speeds (linear speed, angular speed, covariance), information also subject to uncertainties;
- their destinations;
- their "2D" footprints, depending on their speeds and the state of their lifting systems allowing maintaining the product collection support(s) on the robot;
- their states, for example among the following predetermined states: blocked, at slow speed, in movement, waiting for the picking of a product by the picking operator and the placing on the robot (or more specifically in the correct collection support, as described below), waiting for the other robot to be served, . . . .

All this information allows each robot to take into account the movement and localisation of the other robot, in real time, and thus to adapt its own movement and positioning in real time.

However, although performed in real time, these inter-robot communications may suffer from certain uncertainties or inaccuracies, in particular due to the techniques used to obtain this information (for example for the localisation or the speed).

This technique proposes to overcome in particular certain inaccuracies of the individual systems for localising robots, by implementing a technique for pattern recognition of a robot by another robot, for example via a dedicated pattern detection or recognition module. Thus, each robot can know the relative distance between itself and another robot. This allows in particular avoiding the collisions between robots, for example in a use case where two robots follow each other, next to a picking operator. Indeed, if the localisation of the "front" robot is inaccurate and positions it one metre in front of its real position, the "rear" robot could consider that there is a large space in front of it when in reality the "front" robot can be very close. Any movement of the "rear" robot could be inappropriate, a forward movement could for example lead to a collision before the "front" robot. The pattern detection module integrated or connected to any robot therefore allows avoiding collisions between robots.

Finally, it is also possible for the fleet manager 130 to supervise/synchronise the movements of two robots dedicated to a picking operator, in addition to the exchanges between the robots. Indeed, the fleet manager 130 has in particular other information at its disposal (such as, for example, that related to the productivity of a picking operator) and can transmit movement commands to each of the robots.

The task manager 140 is for example an on-board computer of the robot and having in particular a processor, a RAM (random access memory) and a graphics card.

The management system 100 corresponds for example to one or more physical servers on site (in the warehouse or in a dedicated space close to the warehouse), remote (at a server host for example) or dematerialised (on the "cloud"), capable of implementing the different tasks and steps described above and below.

In addition, each of the modules constituted by the picking manager 110, the order manager 120 and the fleet manager 130, corresponds for example to a software module which communicates with at least one database, for implementing the different tasks and steps described above and below. Each of these modules can also correspond to hardware elements, such as computers or servers, operating in interaction, within the management system.

Figure 2:
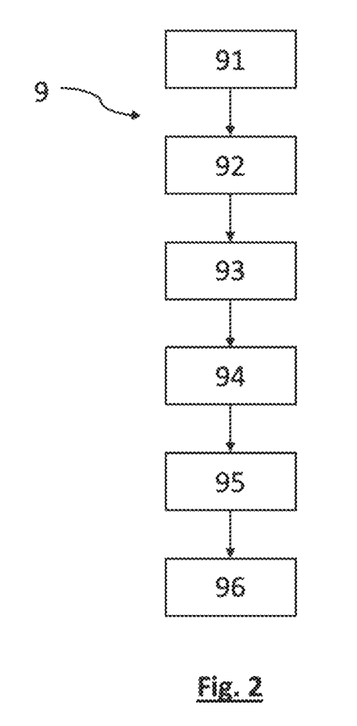
FIG. 2 schematically illustrates the different steps of the method for managing a plurality of mobile robots for preparing orders for products stored in a warehouse according to the proposed technique.

C—Method for Managing a Plurality of Mobile Robots for Preparing Orders for Products Stored in a Warehouse FIG. 2 schematically illustrates the steps of the method 9 for managing a plurality of autonomous mobile robots, or collection robots, for preparing orders for products stored in a warehouse. More particularly, the method is implemented in a warehouse comprising a plurality of spaces for storing the products, a plurality of zones for picking the products by a plurality of operators and a plurality of zones for collecting the product picked by collection robots, as described in more detail in the following description. Thus, the method comprises the following steps implemented in real time:

generating and transmitting 91 data for managing the warehouse, by a product picking manager;

receiving 92, by an order manager, the data for managing the warehouse comprising at least one plurality of order data and;

processing 93, by the order manager, the data for managing the warehouse, delivering order scheduling data;

determining 94, by the order manager, at least one picking zone allocated to a picking operator for processing at least one portion of at least one order and at least one collection zone allocated to one of the collection robots for processing at least one portion of at least one order and;

receiving 95, by a fleet manager, the order scheduling data from said order manager;

generating and transmitting 96, by the fleet manager, a plurality of movement commands to the collection robots, taking into account at least the determined collection and picking zones and the order scheduling data.

The picking manager, the order manager and the fleet manager are described in more detail later in the description.

Figure 3:
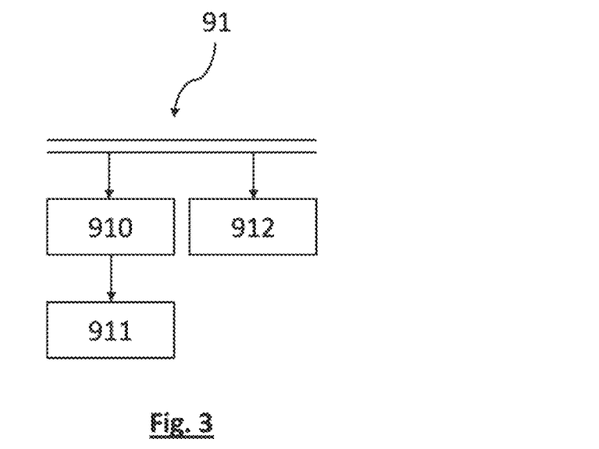
FIG. 3 schematically illustrates sub-steps of a step of the management method of FIG. 2.

FIG. 3 schematically illustrates the sub-steps of the step 91 of generating and transmitting warehouse management data. More specifically, step 91 comprises a sub-step 910 of receiving and processing data relating to the physical configuration of the warehouse 113 and a sub-step of generating 911 at least one navigation graph of said collection robots within said warehouse.

Step 91 further comprises a sub-step 912 of receiving and processing data relating to the picking operators 114, to the inventory of the products 115 stored in the warehouse and to a list of orders 116 to be prepared.

Figure 4:
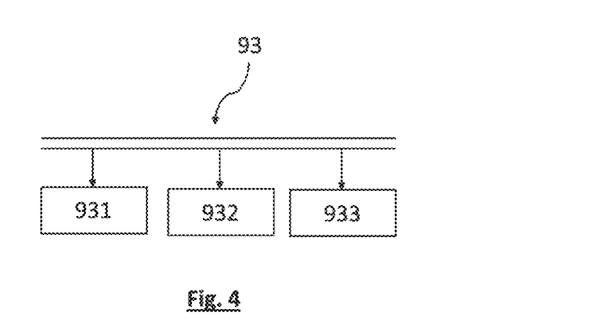
FIG. 4 schematically illustrates sub-steps of another step of the management method of FIG. 2.

FIG. 4 schematically illustrates the sub-steps of the step 93 for processing warehouse management data and delivering order scheduling data. More specifically, step 93 comprises a sub-step 931 of generating an optimal routing of the movements of the picking operators and the collection robots within the warehouse.

Step 93 further comprises a sub-step 932 of storing data relating to the picking operators, this data comprising the number of picking operators present in the warehouse, their performance, their experience and their statistics.

Step 93 further comprises a sub-step 933 of generating a picking strategy comprising a plurality of picking tasks for the picking and collecting operators for the mobile robots.

Figure 5:
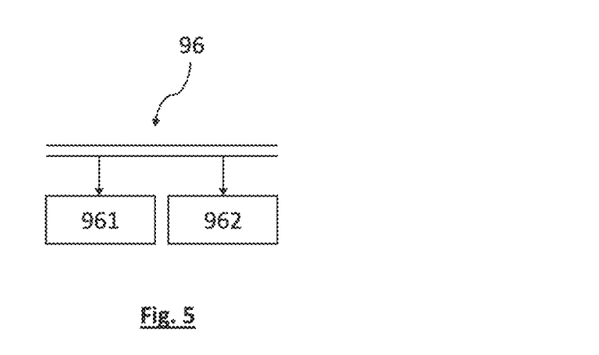
FIG. 5 schematically illustrates sub-steps of yet another step of the management method of FIG. 2.

FIG. 5 schematically illustrates the sub-steps of the step 96 of generating and transmitting a plurality of movement commands to the collection robots. More specifically, step 96 comprises a sub-step 961 of determining an optimal navigation route for the robots and a sub-step 962 of planning and assigning the navigation routes to the robots.

The different steps of the method 9 for managing a plurality of mobile robots for preparing orders for products stored in a warehouse are described in more detail in relation to the management system described above.

Figure 6:
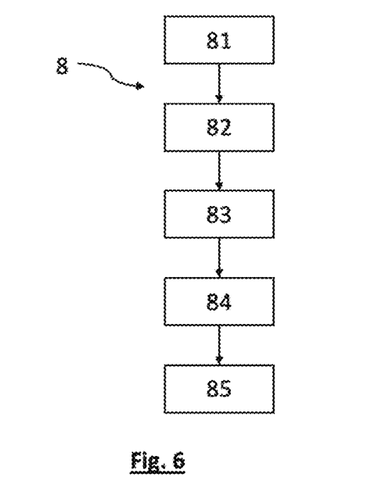
FIG. 6 schematically illustrates the different steps of the order preparation method according to the proposed technique.

Moreover, the proposed technique also relates to a method 8 for preparing orders for products stored in a warehouse 1. More particularly, the method is implemented in a warehouse comprising a plurality of spaces for storing the products, a plurality of zones for picking the products by a plurality of picking operators and a plurality of zones for collecting the products picked by autonomous mobile robots, or collection robots, as described in more detail later in the description. Thus, the method comprises the following steps:

picking 81, by each picking operator, at least one product of at least one order from a picking zone which is allocated to him;

collecting 82, by at least one collection robot, picked products corresponding to at least one portion of at least one order in a collection zone comprising at least one picking zone;

moving 83 said collection robots to an order reconstitution and/or shipping zone;

reconstituting 84 said orders from said products collected by said collection robots; and shipping 85 said reconstituted orders.

The different steps of the method 8 for preparing orders for products stored in a warehouse are described in more detail in relation to the examples of operation of the proposed technique described below in relation to FIGS. 7 to 14.

Moreover, according to a variant, the collection step is implemented by at least two collection robots for at least one of the picking operators, with the aim of further increasing the performance of each operator by allowing him to pick more products without increasing their movements.

This variant is described in more detail above, in particular in relation to the robot task manager.

Moreover, an optimisation of this variant can be obtained thanks to robots which can carry two mobile collection supports, that is to say on which the products can be deposited by a picking operator in two distinct containers. This technical feature is described in particular in patent application FR2007360 by the same applicant filed on 10 Jul. 2020.

Thus, it is possible for a picking operator to be accompanied by two robots each carrying two mobile picking supports, which offers the possibility of placing picked products in four distinct supports, further optimising the order picking performance.

The features described above relating to the two-way exchange of information between two robots are therefore also suitable for robots carrying two or more mobile collection supports. For example, it is important for each robot to know the progress of the order preparation for each of the four collection supports available to the picking operator.

D—Examples of Operation of the Proposed Technique

Different examples are then illustrated, showing the operation of the proposed technique, treated as simple illustrative, and not limiting, examples in support of FIGS. 7 to 14.

It should be noted that the identical elements in the different figures have the same references in order to simplify the understanding of the description.

As previously explained, the proposed technique is capable of determining picking zones for the operators and collection zones for the robots of the system depending on the orders to be prepared and the state of the warehouse in real time.

Figure 7:
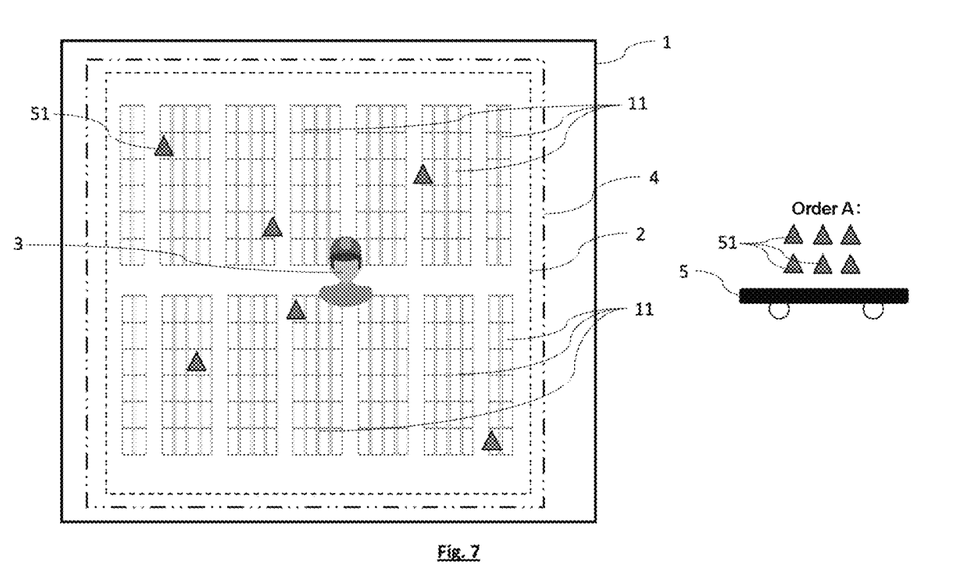
FIG. 7 illustrates a first example of operation of the warehouse according to the proposed technique.

FIG. 7 illustrates a first relatively simple example in which there is only one order to be prepared, namely the order A. The management method 9 has therefore determined, depending on the different constraints of the warehouse 1 and of the order A, that the order A could be executed by a single picking operator 3 to whom a picking zone 2 comprising all the storage spaces 11 of warehouse 1 was assigned.

Thus, the picking operator 3 has the mission to pick all the products 51 of the order A in the picking zone 2 which, in this case, covers the entire warehouse 1.

Since there is only one picking zone 2, there can only be one collection zone 4 for the robots. The management method 9 has determined, in this example, that a single collection robot 5 could collect all the products 51 picked by the picking operator 3.

Thus, the collection robot 5 will travel the picking zone 2 passing through the relevant product grouping points (not illustrated) in order to collect the products 51 picked up by the picking operator 3. Once all the products have been collected by the collection robot 5, the latter will move towards an order reconstitution zone (not illustrated) so that the order A is then shipped.

Figure 8:
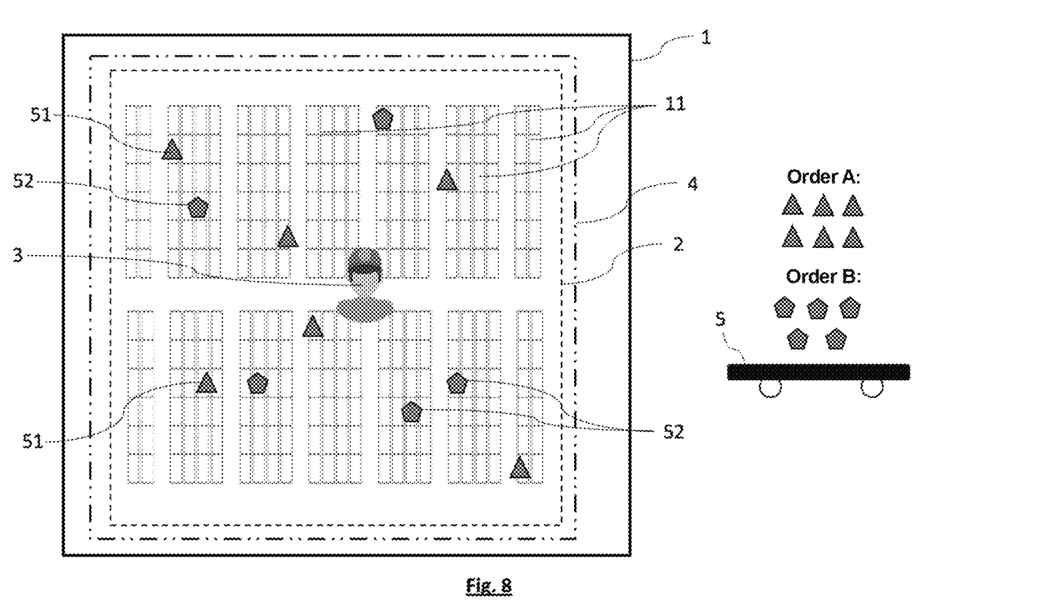
FIG. 8 illustrates a second example of operation of the warehouse according to the proposed technique.

FIG. 8 illustrates a second example in which there are two orders to be prepared, namely the order A and the order B.

The management method 9 has therefore determined, depending on the different constraints of the warehouse 1 and the orders A and B to be prepared, that the orders A and B could again be executed by a single picking operator 3 to whom a picking zone 2, comprising all the storage spaces 11 of the warehouse 1, was affected.

Thus, the picking operator 3 has the mission to picking all the products 51 of the order A but also all the products 52 of the order B in the picking zone 2.

Since there is only one picking zone 2, there can be only one picking zone 4 for the robots. The management method 9 has therefore determined, in this example, that a single collection robot 5 could collect all the products 51 and 52 picked by the picking operator 3.

Thus, the collection robot 5 will travel through the picking zone 2 by passing through the relevant product grouping points (not illustrated) in order to collect the products 51 and 52 picked by the picking operator 3.

Once all products 51, 52 have been collected by the collection robot 5, the latter will move towards an order reconstitution zone (not illustrated) so that the orders A and B are then shipped.

Figure 9:
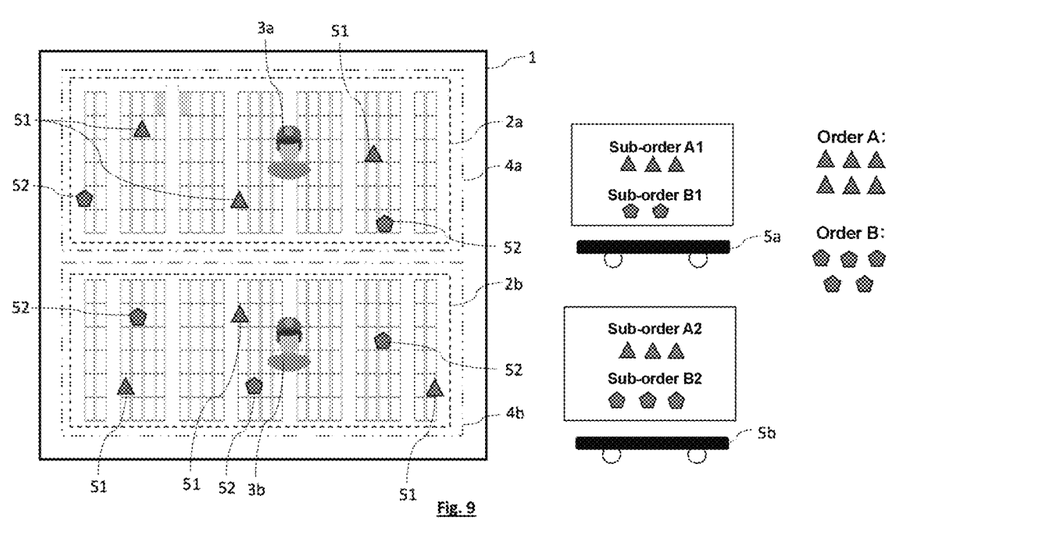
FIG. 9 illustrates a third example of operation of the warehouse according to the proposed technique.

FIG. 9 illustrates a third example in which there are again two orders to be prepared, namely the order A and the order B.

The management method 9 has this time determined, depending on the different constraints of the warehouse 1 and the orders A and B to be prepared, that the orders A and B should each be divided into two sub-orders A1, A2 and B1, B2. Indeed, taking into account in particular the location of the products and the experience of the picking operators 3, the management system 100 has determined, in this example, that it was more efficient to divide the warehouse into two picking zones 2a, 2b. Thus, and since there can only be one picking operator per picking zone in order to optimise their efficiency, the warehouse 1 has two operators 3a, 3b assigned respectively to the zone 2a and to the zone 2b.

In this example, the picking zones 2a and 2b have similar dimensions and have substantially the same number of storage spaces 11 in order to simplify the description of the example. However, it is recalled that, depending on the state/configuration of the warehouse, it is possible to extend the zone 2a and reduce the zone 2b in the case where the picking operator 3a is more experienced than the operator 3b or else if the number of pickings in the zone 2a is lower than that of the zone 2b, for example.

Thus, as illustrated in FIG. 9, the picking operator 3a must pick only the products 51 and 52 of the orders A and B which are located in his zone 2a. Similarly, the picking operator 3b must only pick products 51 and 52 of the orders A and B which are located in his zone 2b.

The warehouse 1 comprises, in this example, two picking zones 2a and 2b. The management method 9 has, in this example, determined depending on the constraints of the warehouse and the orders A and B to define two collection zones, namely the collection zones 4a and 4b which are illustrated in dashed lines. A collection robot has been assigned to each of these two zones in order to collect the products taken by the two picking operators 3a, 3b.

More specifically, and in relation to this third example, a first collection robot 5a will travel the picking zone 2a passing through the relevant product grouping points (not illustrated) in order to collect the products 51 and 52 of the sub-orders A1 and B1 sampled by the picking operator 3a.

Similarly, the collection robot 5b will travel the picking zone 2b passing through the relevant product grouping points (not illustrated) in order to collect the products 51 and 52 of the sub-orders A2 and B2 picked by the picking operator 3b.

Figure 10:
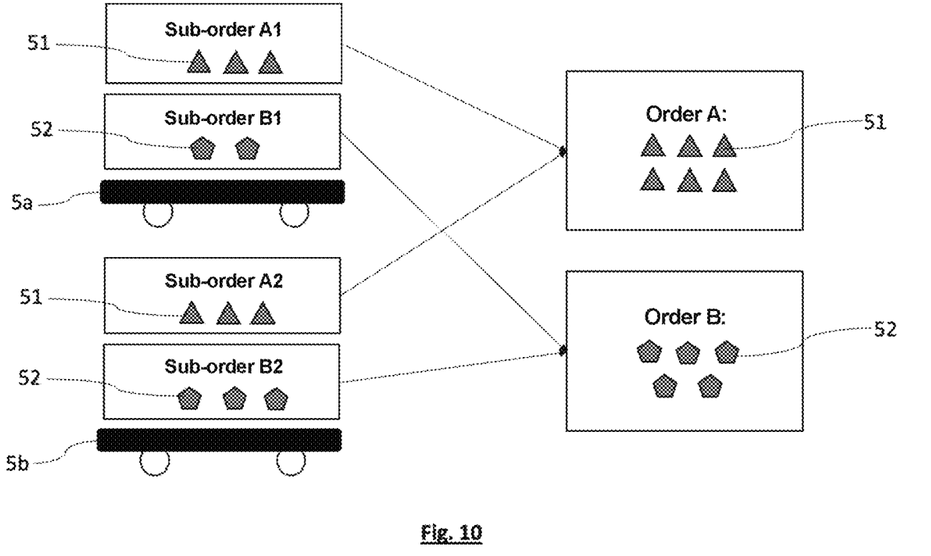
FIG. 10 illustrates the reconstitution of the different orders made in the warehouse of FIG. 9.

At the end of this collection of products, the collection robots 5a and 5b will move towards an order reconstitution zone (not illustrated). The order reconstitution zone allows, as illustrated in FIG. 10, reconstituting the orders from the products of the sub-orders collected by different collection robots. The order reconstitution was not necessary in the preceding examples since there was only one collection robot.

In this third example, it is observed that the order A is reconstituted by grouping together the products 51 of the sub-order A1 collected by the collection robot 5a and the products 51 of the sub-order A2 collected by the collection robot 5b. Similarly, the order B is reconstituted by grouping together the products 52 of the sub-order B1 collected by the collection robot 5a and the products 52 of the sub-order B2 collected by the collection robot 5b. Once the orders A and B have been reconstituted, these orders can then be shipped.

Figure 11:
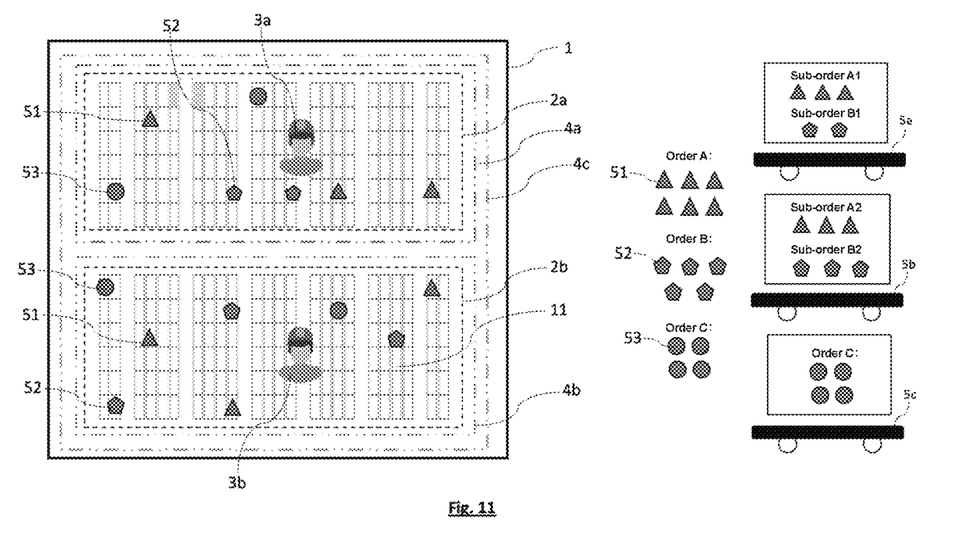
FIG. 11 illustrates a fourth example of operation of the warehouse according to the proposed technique.

FIG. 11 illustrates a fourth example in which there are three orders to be prepared, namely the orders A and B identical to the preceding example and the order C.

The management method 9 has determined, depending on the different constraints of the warehouse 1 and the orders A, B and C to be prepared, that the warehouse 1 had to be divided into two picking zones 2a and 2b each allocated respectively to the picking operators 3a and 3b.

In this example, the picking zones 2a and 2b again have similar dimensions and have substantially the same number of storage spaces 11 in order to simplify the description of the example. But, as previously seen, these zones could be different in practice.

As illustrated, the picking operator 3a must pick only the three products 51 of the order A, the two products 52 of the order B and the two products 53 of the order C which are located in his zone 2a. Similarly, the picking operator 3b must pick only the three products 51 of the order A, the three products 52 of the order B and the two products 53 of the order C which are located in his zone 2b.

The warehouse 1 comprises, in this example, two picking zones 2a and 2b. The management method 9 has, in this example, determined depending on the constraints of the warehouse and the orders A, B and C that it was necessary to define three collection zones, namely the collection zones 4a, 4b and 4c which are illustrated in phantom lines. A collection robot has been assigned to each of these three zones in order to collect the products picked by the two picking operators 3a, 3b.

More specifically, and in relation to this fourth example, the collection robot 5a will travel the picking zone 2a passing through the relevant product grouping points (not illustrated) in order to collect the products 51 and 52 of the sub-orders A1 and B1 sampled by the picking operator 3a.

Similarly, the collection robot 5b will travel the picking zone 2b by passing through the relevant product grouping points (not illustrated) in order to collect the products 51 and 52 of the sub-orders A2 and B2 picked by the picking operator 3b.

Finally, the collection robot 5c will travel the collection zone 4c passing through the relevant product grouping points (not illustrated) in order to collect the products 53 of the order C picked by each of the picking operators 3a and 3b. More particularly the collection zone 4c covers the picking zones 2a and 2b, unlike the collection robots 5a and 5b which respectively collect only the products taken from the picking zones 2a and 2b.

Figure 12:
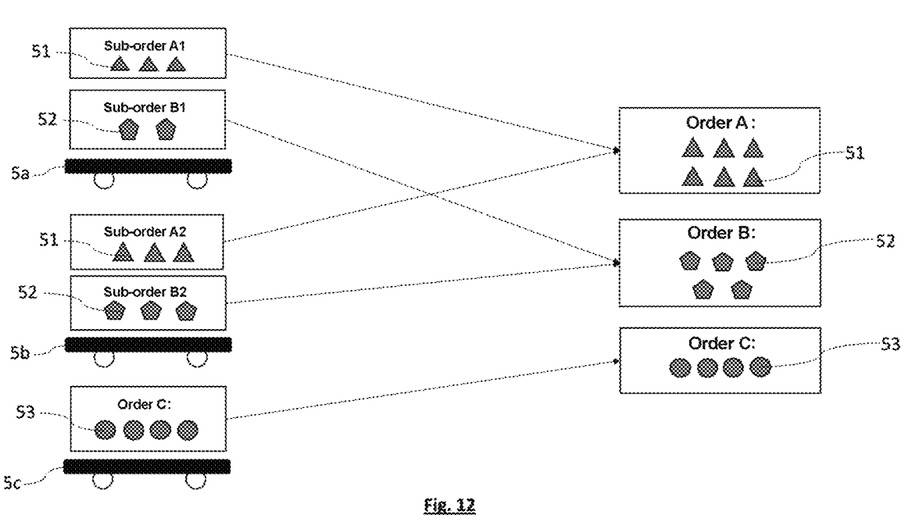
FIG. 12 illustrates the reconstitution of the different orders made in the warehouse of FIG. 11.

At the end of this collection of products, the collection robots 5a, 5b and 5c will be directed towards an order reconstitution zone (not illustrated) in order to complete the orders, as illustrated in FIG. 12.

In this fourth example, it is observed that the order A is reconstituted by grouping together the products 51 of the sub-order A1 collected by the collection robot 5a and the products 51 of the sub-order A2 collected by the collection robot 5b. Similarly, the order B is reconstituted by grouping together the products 52 of the sub-order B1 collected by the collection robot 5a and the products 52 of the sub-order B2 collected by the collection robot 5b.

Finally, the order C does not need to be reconstituted because all the products 53 have been collected by a single collection robot, namely the collection robot 5c.

Once the orders A, B and C have been reconstituted, these orders can then be shipped.

It is noted, in view of the first four examples, that the picking operators are capable of picking products for different orders, and this without worrying about the number of robots which will then be used to collect these picked products. It is the order manager 120 which has the role of defining/determining how many robots must then be implemented to optimally collect all the products necessary to complete the different orders. As described above with reference to the fourth example, some orders (orders A and B) can be divided into sub-orders (A1, A2, 31, B2) which will be collected by several collection robots (5a, 5b) while other orders (the order C in this case) are collected by a single and unique collection robot (5c).

Figure 13:
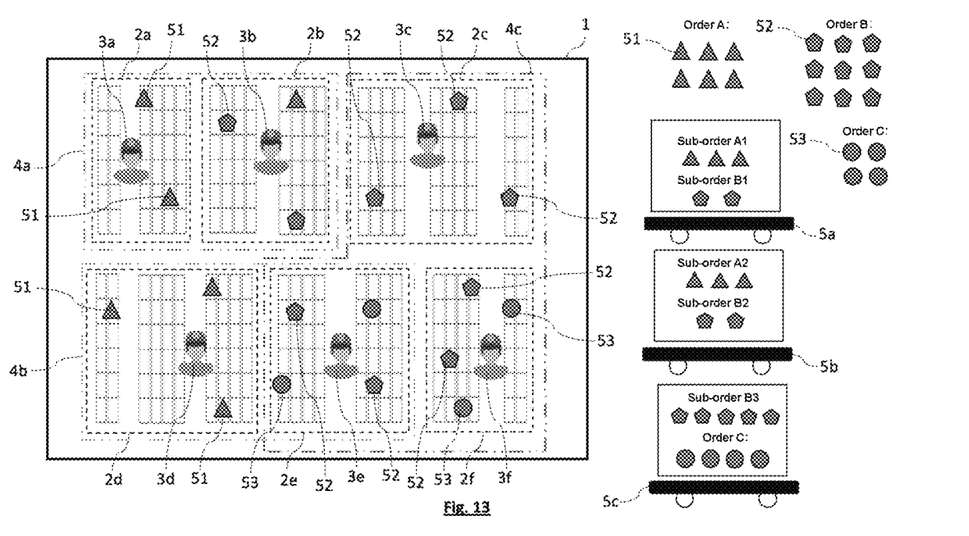
FIG. 13 illustrates a fifth example of operation of warehouse according to the proposed technique.

FIG. 13 illustrates a fifth example in which there are again three orders to be prepared, namely the orders A, B and C.

The management method 9 has determined, depending on the different constraints of the warehouse 1 and the orders A, B and C to be prepared, that the warehouse 1 should be divided into six picking zones 2a to 2f each allocated respectively to the picking operators 3a to 3f.

In this example, the picking zones 2a to 2f have different dimensions and have a number of storage spaces 11 which are also different in order to balance the workload on all the picking operators 3a-3f.

As illustrated, the product picking is divided as follows:
the picking operator 3a picks the two products 51 of the order A which are located in his zone 2a;
the picking operator 3b picks the product 51 of the order A and the two products 52 of the order B which are located in his zone 2b;
the picking operator 3c picks the three products 52 of the order B which are located in his zone 2c;
the picking operator 3d picks the three products 51 of the order A which are located in his zone 2d;
the picking operator 3e picks the two products 52 of the order B and the two products 53 of the order C which are located in his zone 2e; and
the picking operator 3f picks the two products 52 of the order B and the two products 53 of the order C which are located in his zone 2f.

As previously indicated, the warehouse 1 therefore comprises, in this example, six picking zones 2a to 2f as well as six picking operators 3a to 3f. The management method 9 has, in this example, determined depending on the constraints of the warehouse and the orders A, B and C that it was necessary to define three collection zones, namely the collection zones 4a, 4b and 4c which are illustrated in phantom lines in FIG. 13. A collection robot has been assigned to each of these three zones in order to collect the products taken by the six picking operators 3a to 3f.

More specifically, and in relation to this fifth example, the collection robot 5a is allocated to the collection zone 4a which covers the picking zones 2a and 2b. The collection robot 4a will therefore travel the picking zones 2a and 2b by passing through the relevant product grouping points (not illustrated) in order to collect the products 51 and 52 of the sub-orders A1 and B1 taken by the picking operators 3a and 3b.

Similarly, the collection robot 5b is allocated to the collection zone 4b which covers the picking zones 2d and 2e. The collection robot 4b will therefore travel the picking zones 2d and 2e by passing through the relevant product grouping points (not illustrated) in order to collect the products 51 and 52 of the sub-orders A2 and B2 picked by the picking operators 3d and 3e. It is noted that the robot 5b travels the picking zone 2e, but that it does not pick the products 53 of the order C, although these products 53 have been picked by the picking operator 3e. Indeed, these products 53 are collected by another collection robot, namely the collection robot 5c. This choice is determined by the order manager 120 and the fleet manager 130 and can be explained in particular by the fact that the collection capacity of the collection robot 4b is not sufficient to also collect the products of the order C.

Finally, the collection robot 5c is allocated to the collection zone 4c which covers the picking zones 2c, 2e and 2f. The collection robot 4c will therefore travel the picking zones 2c, 2e and 2f by passing through the relevant product grouping points (not illustrated) in order to collect the products 52 of the sub-order B3 and the products 53 of the order C picked by each of the picking operators 3c, 3e and 3f. More particularly, it is observed that the collection zone 4c therefore overlaps a portion of the collection zone 4b allocated to the collection robot 5b. In order to avoid the risk of collisions between these two collection robots 4b, 4c, the management system 100 is capable of planning the tasks of each of these robots in order to prevent them both from being in the same aisle at the same time.

Figure 14:
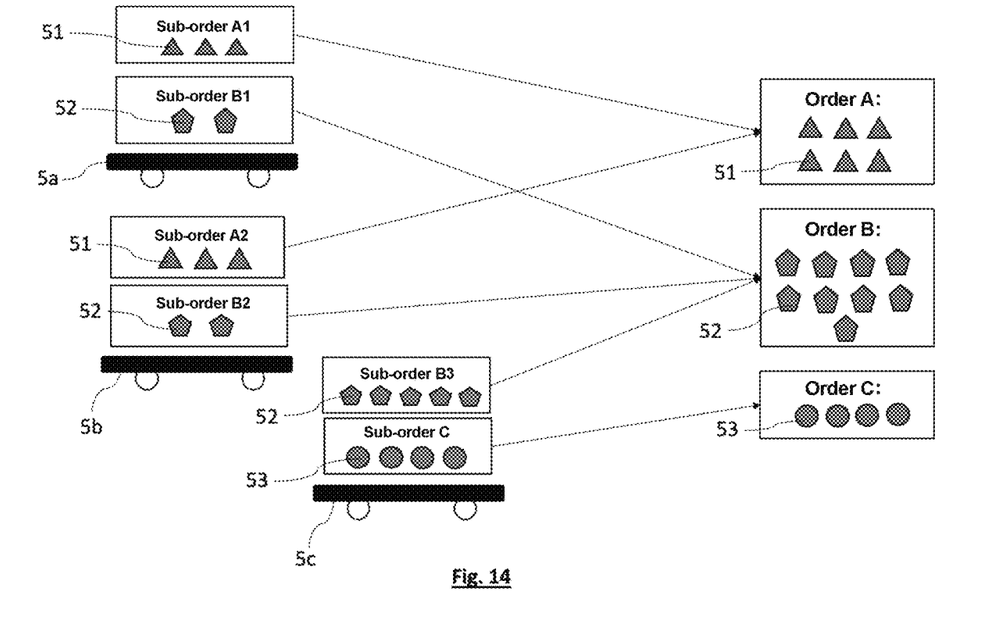
FIG. 14 illustrates the reconstitution of the different orders made in the warehouse of FIG. 13.

At the end of this collection of products, the collection robots 5a, 5b and 5c will be directed towards an order reconstitution zone (not illustrated) in order to complete the orders, as illustrated in FIG. 14.

In this fifth example, it is observed that the order A is reconstituted by grouping together the products 51 of the sub-order A1 collected by the collection robot 5a and the products 51 of the sub-order A2 collected by the collection robot 5b. Similarly, the order B is reconstituted by grouping together the products 52 of the sub-order B1 collected by the collection robot 5a, the products 52 of the sub-order B2 collected by the collection robot 5b and the products 52 of the sub-order B3 collected by the collection robot 5c.

Finally, the order C does not need to be reconstituted because all the products 53 have been collected by a single collection robot, namely the collection robot 5c.

Once the orders A, B and C have been reconstituted, these orders can then be shipped.

These different examples show that the proposed technique is easily scalable and has a very high real-time reactivity depending on the evolving constraints which are encountered in the warehouse. The picking zones are not fixed and can change many times, within the same day if necessary, in order to respond in real time to the orders to be prepared and in order to optimise the workload depending on the profile of each picking operator. Thus, the performance of each picking operator is maximised.

Similarly, the collection robots are assigned in real time to collection zones which can cover, according to the needs, several picking zones and which can sometimes even overlap therebetween. These zones are determined in real time depending on the state of the fleet of robots and the warehouse in order to minimise the movements of the robots. In this manner, the robots are used optimally and their performance is maximised in order to execute the orders while optimising the overall energy consumption of the fleet.

Of course, it is understood that these relatively simple examples are only used to illustrate the proposed technique and do not limit the implementation of the proposed technique to the previously described examples. It is obvious that this technique can be applied to warehouses with larger dimensions, a higher number of storage spaces, a higher number of picking operators and collection robots as well as a more significant number of orders to be prepared as well. Indeed, the proposed technique, which is described in detail above, is capable of taking into account all these constraints and is capable of adapting to all types of warehouses.

The invention claimed is:

1. A management method comprising:
managing a plurality of autonomous mobile robots, called collection robots, for preparing orders for products stored in a warehouse comprising a plurality of spaces for storing products, a plurality of zones for picking the products by a plurality of operators and a plurality of zones for collecting the products picked by said collection robots, wherein the managing comprises the following implemented in real time:
generating and transmitting data for managing said warehouse, by a product picking manager;
receiving, by an order manager, said data for managing said warehouse comprising at least one plurality of order data;
processing, by said order manager, said data for managing said warehouse, delivering order scheduling data;
determining, by said order manager, at least one picking zone allocated to a picking operator for processing at least one portion of at least one order, each picking zone being allocated to only one picking operator, and determining at least one collection zone allocated to one of said collection robots for processing at least one portion of at least one order;
receiving, by a fleet manager, said order scheduling data from said order manager; and
generating and transmitting, by said fleet manager, a plurality of movement commands to said collection robots, taking into account at least said determined collection and picking zones and said order scheduling data.

2. The management method according to claim 1, wherein the generating and transmitting data for managing said warehouse comprise receiving and processing data relating to a physical configuration of the warehouse and generating at least one navigation graph of said collection robots within said warehouse.

3. The management method according to claim 1, wherein the generating and transmitting data for managing said warehouse further comprises receiving and processing data relating to said picking operators, to an inventory of the products stored in said warehouse and to a list of orders to be prepared.

4. The management method according to claim 1, wherein the processing said data for managing said warehouse and delivering said order scheduling data comprise generating an optimal routing of the movements of the picking operators and the collection robots within the warehouse.

5. The management method according to claim 1, wherein the processing said data for managing said warehouse and delivering said order scheduling data comprise storing said data relating to said picking operators, this data comprising at least one indicator from the picking operators present in the warehouse, their efficiency, their experience and their statistics.

6. The management method according to claim 1, wherein the processing said data for managing said warehouse and delivering said order scheduling data comprise generating a picking strategy comprising a plurality of picking tasks for said picking operators and for said collection mobile robots.

7. The management method according to claim 1, wherein the generating and transmitting a plurality of movement commands to said collection robots comprises determining at least one optimal navigation route of said collection robots and planning and assigning said navigation routes to said collection robots.

8. A system for managing a plurality of autonomous mobile robots, called collection robots, for preparing orders for products stored in a warehouse comprising a plurality of spaces for storing the products and a plurality of zones for picking the products by a plurality of operators, each picking zone being allocated to only one picking operator, and a plurality of zones for collecting the products picked by said robots, said management system comprising:
a picking manager configured to receive data from a system for managing said warehouse and generate and transmit data for managing said warehouse;
an order manager configured to receive at least said data for managing said warehouse from said picking manager and deliver order scheduling data; and
a fleet manager configured to order scheduling data from the order manager and communicate movement commands to said plurality of collection robots.

9. A method comprising:

preparing orders for products stored in a warehouse comprising a plurality of spaces for storing products, a plurality of zones for picking the products by a plurality of picking operators and a plurality of zones for collecting the products picked by a plurality of autonomous mobile robots, called collection robots, said preparing comprising:

picking, by each picking operator, at least one product of at least one order from a picking zone which is allocated to that picking operator, each picking zone being allocated to only one picking operator;

collecting, by at least one collection robot, products picked by a picking operator of the plurality of picking operators, corresponding to at least one portion of at least one order in a collection zone comprising at least one picking zone;

moving said collection robots to an order reconstitution and/or shipping zone;

reconstituting said orders from said products collected by said collection robots; and shipping said reconstituted orders.

10. The method according to claim 9, wherein said collecting is implemented by at least two of the collection robots for at least one of said picking operators.

11. The method according to claim 10, further comprising implementing a two-way communication between said at least two collection robots.

12. The method according to claim 10, further comprising implementing a pattern recognition by at least one of said at least two collection robots.

* * * * *